(12) United States Patent
Su

(10) Patent No.: US 12,280,843 B2
(45) Date of Patent: Apr. 22, 2025

(54) FOLDING BICYCLE RACK WITH AUTOMATIC WHEEL FIXING

(71) Applicant: Quzhou T-NINE Trading Co., Ltd., Quzhou (CN)

(72) Inventor: John Su, Quzhou (CN)

(73) Assignee: Quzhou T-NINE Trading Co., Ltd., Quzhou (CN)

( * ) Notice: Subject to any disclaimer, the term of this patent is extended or adjusted under 35 U.S.C. 154(b) by 0 days.

(21) Appl. No.: 18/450,335

(22) Filed: Aug. 15, 2023

(65) Prior Publication Data

US 2024/0051629 A1    Feb. 15, 2024

(30) Foreign Application Priority Data

Aug. 22, 2022    (CN) .......................... 202222223079.7

(51) Int. Cl.
  *B62H 3/08*    (2006.01)
  *B62H 3/06*    (2006.01)
  *B62H 3/12*    (2006.01)

(52) U.S. Cl.
  CPC ................. *B62H 3/08* (2013.01); *B62H 3/06* (2013.01); *B62H 3/12* (2013.01)

(58) Field of Classification Search
  CPC ............... B62H 3/06; B62H 3/08; B62H 3/12
  See application file for complete search history.

(56) References Cited

U.S. PATENT DOCUMENTS

| 5,246,120 | A | * | 9/1993 | Walker | B62H 3/12 |
| | | | | | 211/21 |
| 5,749,474 | A | * | 5/1998 | Woodcock | B62H 3/04 |
| | | | | | 211/96 |
| 8,413,820 | B2 | * | 4/2013 | Steadman | B62H 3/06 |
| | | | | | 211/21 |
| 9,610,993 | B1 | * | 4/2017 | Ho | B62H 3/06 |
| 10,618,582 | B1 | * | 4/2020 | Liu | B62H 3/06 |
| 11,008,060 | B1 | * | 5/2021 | Liu | B62H 3/10 |
| 11,312,438 | B1 | * | 4/2022 | Gu | B62H 3/08 |
| 11,505,267 | B1 | * | 11/2022 | Gu | B62H 3/04 |

(Continued)

FOREIGN PATENT DOCUMENTS

| CN | 201512041 U | 6/2010 |
| CN | 108791589 A | 11/2018 |

(Continued)

*Primary Examiner* — Stanton L Krycinski

(57) ABSTRACT

A folding bicycle rack with automatic wheel fixing, including a wall-mounting structure, a bottom frame, and an adjustable positioning assembly including a positioning member and a tilted structure. The wall-mounting structure is vertically fixed on a wall. An end of the bottom frame is in an angularly-restricted rotational connection with a lower end of the wall-mounting structure. The bottom frame is provided with a wheel-receiving groove at least partially running through the bottom frame. The positioning member is arranged at a side of the wheel-receiving groove near the wall, and is fixed in use. The tilted structure is arranged at a side of the wheel-receiving groove away from the wall, and is in an angularly-restricted rotational connection with an end of the bottom frame away from the wall. The positioning member and the tilted structure abut against the tire from opposite sides, respectively to support and limit the tire.

19 Claims, 16 Drawing Sheets

(56) References Cited

U.S. PATENT DOCUMENTS

| | | | | |
|---|---|---|---|---|
| 11,708,120 B1* | 7/2023 | Striebel | ................... | B62H 3/12 |
| | | | | 211/21 |
| 11,780,518 B1* | 10/2023 | Ho | ......................... | B62H 3/06 |
| | | | | 211/19 |
| 12,091,115 B1* | 9/2024 | Liu | ........................ | B62H 3/06 |
| 12,116,069 B1* | 10/2024 | Liu | ........................ | B62H 3/06 |
| 2007/0256989 A1* | 11/2007 | Steadman | ................ | B62H 3/06 |
| | | | | 211/21 |
| 2008/0060886 A1* | 3/2008 | Erghott | ................... | B62H 3/08 |
| | | | | 188/32 |
| 2023/0278654 A1* | 9/2023 | Ward | ..................... | B60R 9/042 |

FOREIGN PATENT DOCUMENTS

| | | | | |
|---|---|---|---|---|
| GB | 283833 A | * | 1/1928 | |
| WO | WO-2011146996 A1 | * | 12/2011 | ............... B62H 3/04 |

* cited by examiner

FOLDING BICYCLE RACK WITH AUTOMATIC WHEEL FIXING

CROSS-REFERENCE TO RELATED APPLICATIONS

This application claims the benefit of priority from Chinese Patent Application No. 202222223079.7, filed on Aug. 22, 2022. The content of the aforementioned application, including any intervening amendments thereto, is incorporated herein by reference in its entirety.

TECHNICAL FIELD

This application relates to bicycle racks, and more particularly to a folding bicycle rack with automatic wheel fixing.

BACKGROUND

The bicycle is generally hung on the wall through a bicycle rack when it is not in use to reduce the space occupation.

The existing bicycle racks are applicable to hanging of bicycles with different handlebar heights, but the tires are exposed, and are prone to wear and damage. Moreover, the bicycles are not fixed, and thus tend to fall to the ground once knocked.

SUMMARY

An objective of the present disclosure is to provide a folding bicycle rack with automatic wheel fixing, which can fix the bicycle to the wall while protecting the tires, and is compatible with tires with different sizes.

The technical solutions of the present disclosure are described below.

This application provides a folding bicycle rack with automatic wheel fixing, comprising:
  a wall-mounting structure;
  a bottom frame; and
  an adjustable positioning assembly;
  wherein the wall-mounting structure is vertically fixed on a wall;
  an end of the bottom frame is in a restricted rotational connection with a lower end of the wall-mounting structure; the bottom frame is provided with a wheel-receiving groove; and a bottom surface of the wheel-receiving groove is provided with a through hole for embedding a tire;
  the adjustable positioning assembly comprises a positioning member and a tilted structure; the positioning member is arranged at a side in the wheel-receiving groove close to the wall, and is fixedly arranged when in use; the tilted structure is arranged at a side in the wheel-receiving groove away from the wall, and is in a restricted rotational connection with an end of the bottom frame away from the wall; and the positioning member and the tilted structure are configured to abut against the tire respectively from the front and rear to support the tire and limit downward movement of the tire.

In some embodiments, the positioning member comprises a tire limit plate; the tire limit plate is fixedly connected to a bottom end of the bottom frame; and the tire limit plate is inclined in a direction away from the bottom frame, and extends towards the wheel-receiving groove such that the tire limit plate is located at a lower side of the tire to support the tire when a bicycle is mounted on the wall.

In some embodiments, the positioning member comprises a positioning wheel; two sides of the bottom frame are each provided with a plurality of positioning holes, and the plurality of positioning holes on one side of the bottom frame and the plurality of positioning holes on the other side of the bottom frame are symmetrically distributed with respect to a center of the positioning wheel; two ends of the positioning wheel are each slidably connected with a fixing ring; two fixing rings are respectively clamped into a pair of symmetrical positioning holes respectively on the two sides of the bottom frame; the plurality of positioning holes are located an end of the bottom frame near the wall-mounting structure, and adjacent positioning holes on the same side are communicated with each other through a chute running through a side end of the bottom frame; a length of the wheel-receiving groove is smaller than a length of the bottom frame; the positioning wheel is detachably arranged on an upper side of the tire limit plate; and a diameter of each of the plurality of positioning holes is larger than a width of the chute.

In some embodiments, a support part of the tilted structure is sheet-shaped, and the tire limit plate is sheet-shaped, so as to increase contact area with the tire.

In some embodiments, a rotation angle range of the bottom frame is 90° from a horizontal direction to a vertically upward direction.

In some embodiments, the tilted structure comprises a main body and two tire limit plates; the two tire limit plates are respectively fixedly connected to two sides of the main body of the tilted structure to restrict lateral movement of the tire; the two tire limit plates are both located at an inner side of the bottom frame, and are independently rotationally connected to the end of the bottom frame away from the wall; and rotational axes of the two tire limit plates are concentric to make the tilted structure have space to receive the tire.

In some embodiments, an angle formed by an upper end and a lower end of the main body of the tilted structure is an obtuse angle; the lower end of the main body of the tilted structure is arc-shaped; and when the tire is embedded and is propped by the two tire limit plates, an arc surface of the lower end of the main body of the tilted structure fits a surface of the tire.

In some embodiments, the bottom frame comprises two side plates and a base plate; the two side plates are fixedly arranged on two sides of the base plate, respectively; a length of each of the two side plates is greater than that of the base plate such that the wheel-receiving groove is formed; the base plate is arranged at an end of each of the two side plates close to the wall-mounting structure; an end of each of the two side plates away from the wall-mounting structure is located outside the tilted structure, and is in rotational connection with the tilted structure; and the tilted structure is provided at a first end of the wheel-receiving groove, and the base plate is provided at a second end of the wheel-receiving groove.

In some embodiments, the tilted structure is at a first rotation angle in an unfolded state, and at this time, the tilted structure is located outside the wheel-receiving groove and extends outwards to guide the tire into the wheel-receiving groove; the tilted structure is at a second rotation angle in a folded state, and at this time, the tilted structure is at least partially accommodated in the wheel-receiving groove; and during a bicycle loading process, the tilted structure is pressed by the tire to maintain a transmission connection with the tire, such that the tilted structure is capable of rotating freely with the tire within a range from the first rotation angle to the second rotation angle.

In some embodiments, a rotation-stopping structure is provided between an inner side wall at an end of the wheel-receiving groove away from the wall-mounting structure and an outer side wall of the tilted structure; the rotation-stopping structure comprises at least one generatrix and at least one sub-point; the at least one generatrix is fixedly provided on the inner side wall of the wheel-receiving groove, and the at least one sub-point is fixedly provided on the outer side of the tilted structure; the bottom frame and the tilted structure are in rotational connection about an rotation axis; and the at least one generatrix and the at least one sub-point are both provided on the same circumference centered on the rotation axis, and a movement trajectory of the at least one generatrix at least partially overlaps a movement trajectory of the at least one sub-point, so that the at least one generatrix is capable of restricting a rotational angle of the at least one sub-point in a forward and/or reverse direction.

In some embodiments, the number of the at least one generatrix is two, and two generatrices are located on a circumference coaxial with the rotation axis between the bottom frame and the tilted structure; the number of the at least one sub-point is two, and two sub-points are located on the circumference where the two generatrices are located; and the two generatrices on the same inner side wall of the wheel-receiving groove are configured for restricting a rotational angle of the tilted structure in the forward and reverse directions, respectively.

In some embodiments, the inner side wall at the end of the wheel-receiving groove away from the wall-mounting structure has a first cymbal-shaped surface with its middle bulging towards outside; the outer side wall of the tilted structure has a second cymbal-shaped surface having a protruding direction opposite to a protruding direction of the first cymbal-shaped surface, and the second cymbal-shaped surface is matched with the first cymbal-shaped surface; the at least one generatrix is fixedly provided on the first cymbal-shaped surface, and the at least one sub-point is fixedly provided on the second cymbal-shaped surface; the inner side wall of the wheel-receiving groove abuts against and fits the outer side wall of the tilted structure; the first cymbal-shaped surface and the second cymbal-shaped surface together form a hollow chamber; and the rotation axis between the bottom frame and the tilted structure is coaxial with the hollow chamber.

In some embodiments, a center of gravity of the tilted structure is not located at a rotation axis between the tilted structure and the bottom frame, so that the tilted structure always has a tendency to rotate towards the first rotation angle or the second rotation angle under a free state.

In some embodiments, two inner sidewalls at an end of the wheel-receiving groove away from the wall are each provided with a limiting protrusion; and the limiting protrusion is located within a rotation range of the tilted structure to abut against an outer side end surface of the tilted structure when the tilted structure is at the first rotation angle and the second rotation angle, so as to limit a forward and/or reverse rotation of the tilted structure.

In some embodiments, the wall-mounting structure comprises a vertical frame and a mounting base; a lower end of the vertical frame is rotationally connected to the end of the bottom frame near the wall; the mounting base is arranged between the vertical frame and the wall; the mounting base is rotationally connected to a back side of the vertical frame around a vertical rotation axis; and the mounting base is fixedly arranged on the wall.

In some embodiments, the back side of the vertical frame is provided with at least two base plates; a front side of the mounting base is provided a plurality of top plates coaxially corresponding to the at least two base plates; a center of each of the at least two base plates and a center of each of the plurality of top plates are both provided with a mounting through hole; a bolt is provided in the mounting through hole to lock the vertical frame and the mounting base; and a first damping washer is provided between a head of the bolt and each of the plurality of top plates, and a second damping washer is provided between a nut and each of the at least two base plates to increase rotation resistance between the vertical frame and the mounting base.

In some embodiments, an upper end of each of the at least two base plates is provided with a plurality of accommodating through holes; an upper end of each of the plurality of top plates is provided with a plurality of limiting through holes; a marble is provided in each of the plurality of accommodating through holes; an outer end of the marble is located on a side of each of the at least two base plates near a corresponding top plate; and during installation, the outer end of the marble is clamped into one of the plurality of limiting through holes to limit rotation between the vertical frame and the mounting base.

In some embodiments, a protective casing is provided on an outer side of the head of the bolt, and is made of a soft material; the protective casing is in snap fit with an end of the vertical frame; and the protective casing directly or indirectly abuts against the head of the bolt.

In some embodiments, a width of the wheel-receiving groove is larger than or equal to a width of an outer edge of the wall-mounting structure, and a length of the bottom frame is larger than a length of the wall-mounting structure, so that the wall-mounting structure is capable of being accommodated in the bottom frame after the bottom frame is turned upwards and folded.

In some embodiments, an outer sidewall of the wall-mounting structure is fixedly provided with a protrusion, and an inner side wall of the bottom frame is provided with a depression fitting the protrusion, so as to achieve snap fit between the wall-mounting structure and the bottom frame when the bottom frame is folded to overlap the wall-mounting structure.

Compared with the prior art, this application has the following beneficial effects.

(1) In this application, by arranging a fixed positioning member in the bottom and a rotatable and adjustable tilted structure at the end of the bottom away from the wall-mounting structure, the tire is subjected to pressure from the front and back, ensuring that the bicycle can not be moved downwards and thus be suspended by the support and hanged in the air.

(2) The bicycle rack provided in the present application can be folded through the rotating connection of the wall-mounting structure and the bottom, which is space-saving when the bicycle rack is not in use.

(3) The present invention can realize the protection of the bicycle tire through the arrangements of circular arc designs on two sides of the bottom, the lower end of the tilted structure, the contact surface between the positioning wheel and the tire, and the side plate, which prevents the tire from being worn out or extruded. At the same time, the main body of the tilted structure and the tire limit plate are sheet-shaped, which can increase the contact area with the tire to reduce the effect of pressure, avoiding the marks on the surface of the tire due to long-term hanging, since the tire will produce a certain amount of elastic deformation under the influence of gravity when the bicycle is hung. In addition, the two outer sides of the tilted structure and the inner side of the bottom are independently rotationally connected, and the connection axis is coaxial. This can release the space in the inner side of tilted structure for embedding the tire and effectively ensure that the main body of the tilted structure is able to be affixed with the tire for support, compared with the existing rotational connection through a shaft.

(4) By using the bicycle rack provided in the present application, the tire of the bicycle can be fixedly placed in the wheel-receiving groove and the bicycle will not fall down through the mutual cooperation between the tire limit plate, the wheel-receiving groove, the positioning wheel and the tilted structure.

(5) In this application, the positioning wheel is capable of sliding in the chute, and the tilted structure is rotatably connected to one end of the bottom. Hence, the bicycle rack can be used for bicycles with different tire sizes, and has a wider range of application.

(6) In this application, the tire limit plate is used as the positioning member, and a rotation-stopping structure is arranged between the tilted structure and the bottom. In this way, the tilted structure can be matched with various types of tires, and the tires with different sizes can be stored and placed in the wheel-receiving groove. Moreover, the bicycle rack has a simpler structure, fewer parts and lower manufacturing cost.

(7) By designing the matching ends between the side plate of the bottom and the tire side limit plate as cymbal type, the generatrix and the sub-point of the rotation-stopping structure can be stored, and at the same time, the side plate of the bottom and the tire side limit plate can be kept in close matching, so as to achieve complex functions with a simple structure.

(8) By dividing the wall-mounting structure into a vertical frame and a mounting base, where the mounting base is fixed to the wall, and the vertical frame rotationally connected to the bottom, the wall-mounting structure can drive the bottom to adjust the angle with the wall. This facilitates the hanging of the bicycle at an angle that matches with the actual scene. Moreover, in the state of storage, the part of the rack that protrudes outwardly from the wall has a smaller size, which is more conducive to storage.

(9) In this application, a convex point is fixedly provided on the outer wall of the wall-mounting structure, and the inner side wall of the bottom is provided with a concave point cooperating with the convex point, so as to realize the buckling of the wall-mounting structure and the bottom when they are overlapped and folded, and the buckling is more solid.

(10) The rotational angle of the tilted structure is limited by the generatrix and the sub-point, which can ensure that the forward and reverse rotations of the tilted structure are limited. Under the unfolded state, the tilted structure is located outside the wheel-receiving groove and is inclined in a direction away from the bottom frame, which can play a role in guiding the wheel to be pushed into the wheel-receiving groove. In addition, since the tilted structure can be freely rotated within a certain angle relative to the bottom, after the wheel is pushed into the wheel-receiving groove, it will be automatically flipped back with the rotation of the wheel to ensure that the tilted structure can support the tire on the lower side of the tire.

(11) The center of gravity of the tilted structure is located on the side of the main body of the tilted structure where the tire side limit plate is located, which ensures that the tilted structure always has the tendency to rotate towards the first flip angle or the second flip angle under the free state (without being influenced by the wheel), so as to automatically maintain the position of guiding the wheel or supporting the wheel without human adjustment, which is easy and labor-saving.

Figure 1:
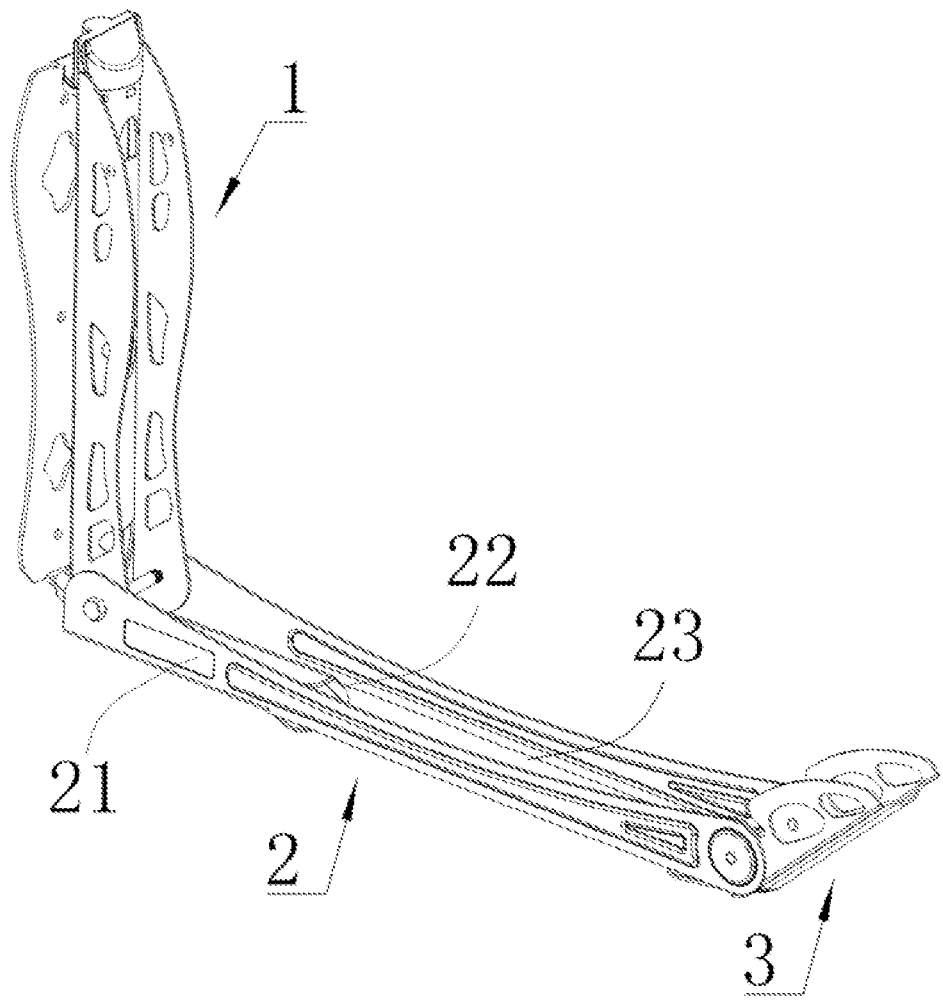
FIG. 1 is a structural diagram of a folding bicycle rack according to Embodiment 1 in an unfolded state.
Figure 2:
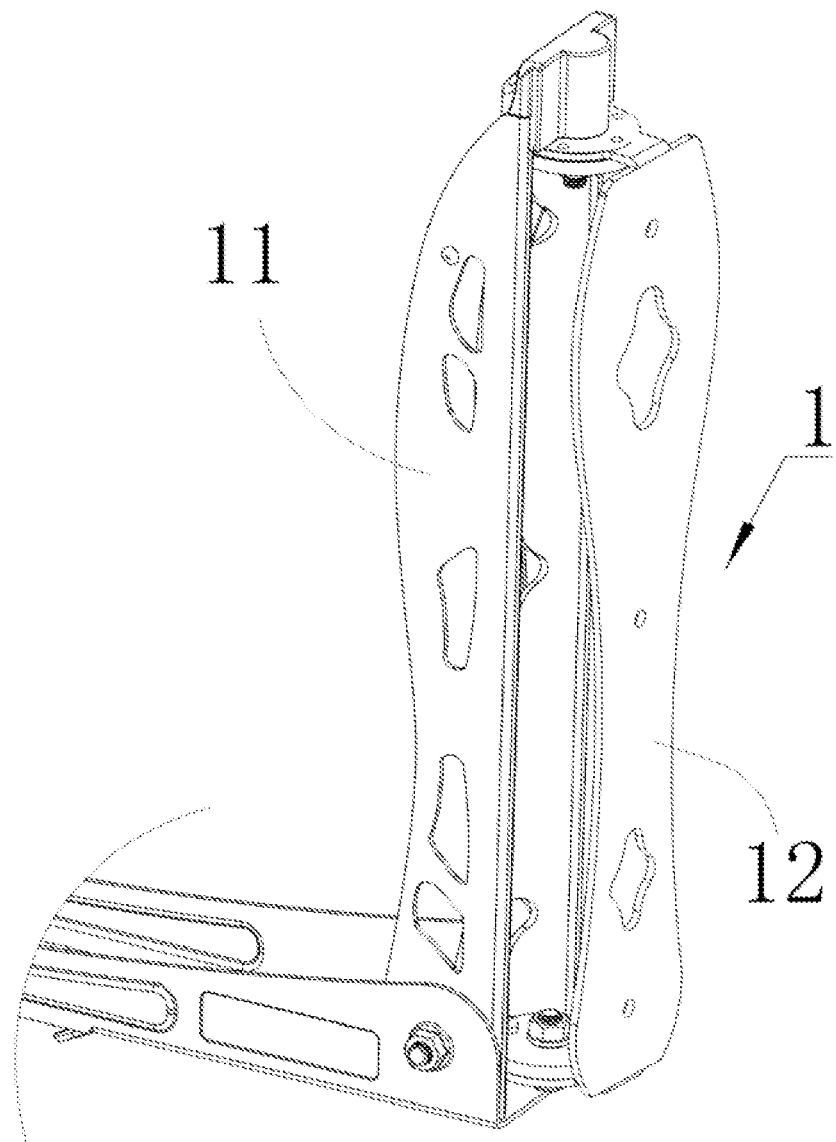
FIG. 2 is a structural diagram of a wall-mounting structure of the folding bicycle rack according to Embodiment 1.
Figure 3:
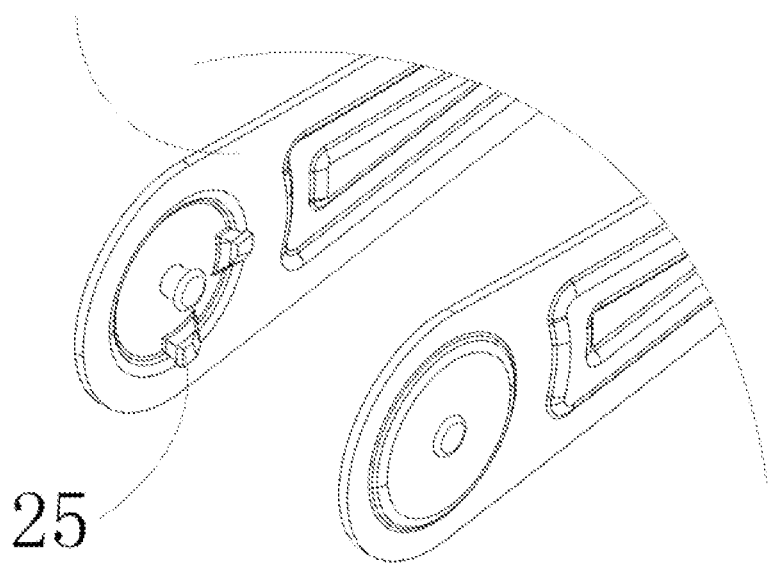
FIG. 3 schematically shows a position where a generatrix is located according to Embodiment 1.

In the drawings: 1, wall-mounting structure; 11, vertical frame; 111, base plate; 12, mounting base; 121, top plate; 13, protective casing; 14, marble; and 15, damping washer; 2, bottom frame; 21, side plate; 22, first tire limit plate; 23, wheel-receiving groove; 24, first chute; 25, generatrix; and 26, limiting protrusion; 3, tilted structure; 31, main body; 32, second tire limit plate; 33, sub-point; 34, second chute; and 4, positioning wheel; and 41, fixing ring.

DETAILED DESCRIPTION OF EMBODIMENTS

Embodiment 1

Referring to FIGS. 1-8, a folding bicycle rack with automatic wheel fixing is provided, which includes a wall-mounting structure 1, a bottom frame 2, and an adjustable positioning assembly.

The wall-mounting structure 1 is perpendicularly fixed on a wall.

The bottom frame 2 includes two side plates 21 and a base plate. The two side plates 21 are fixedly arranged on two sides of an upper end of the base plate, respectively. The length of the side plates 21 is greater than that of the base plate such that a wheel-receiving groove 23 can be formed. A bottom surface of the wheel-receiving groove 23 is at least partly penetrated through the bottom frame 2 for embedding a tire. The base plate is arranged at an end of each of the two side plates 21 close to the wall-mounting structure 1. An end of each of the two side plates 21 close to the wall-mounting structure 1 is located at outside the wall-mounting structure 1, and is in rotational connection with the wall-mounting structure. The base plate is located at a front end of the wheel-receiving groove 23. Preferably, the rotational angle between the base plate 2 and the wall-mounting structure 1 is 90° from a horizontal direction to a vertically upward direction. The specific rotational connection structure between the base plate 2 and the wall-mounting structure 1 is known for those skilled in the art, and therefore will not be described herein. The width of the wheel-receiving groove 23 of the bottom frame 2 is greater than or equal to the width of an outer edge of the wall-mounting structure 1, and the length of the bottom frame 2 is greater than the length of the wall-mounting structure 1, so that the bottom frame 2 can be upwardly flipped and folded to overlap with the wall-mounting structure 1 for storage.

The adjustable positioning structure includes a first tire limit plate 22 and a tilted structure 3.

The first tire limit plate 22 is fixedly connected to a bottom end of the bottom frame 2, and is located in the wheel-receiving groove 23. The first tire limit plate 22 is fixedly connected to an end of the base plate where the wheel-receiving groove 23 is located (i.e., the side of the wheel-receiving groove 23 close to the wall). The first tire limit plate 22 is inclinedly arranged with an inclination direction away from the bottom frame 2 and extends towards the wheel-receiving groove 23. By such arrangements, the first tire limit plate 22 is located in the lower side of the tire to support the tire when the bicycle is hung up.

Figure 4:
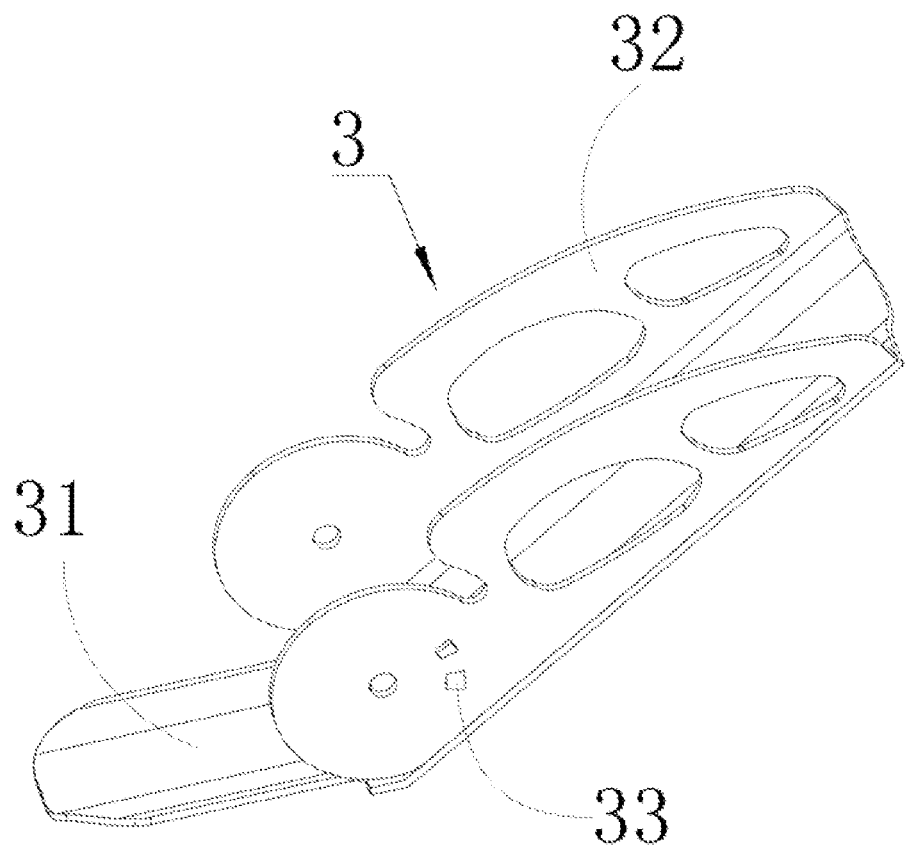
FIG. 4 schematically shows a position where a sub-point is located according to Embodiment 1.
Figure 5:
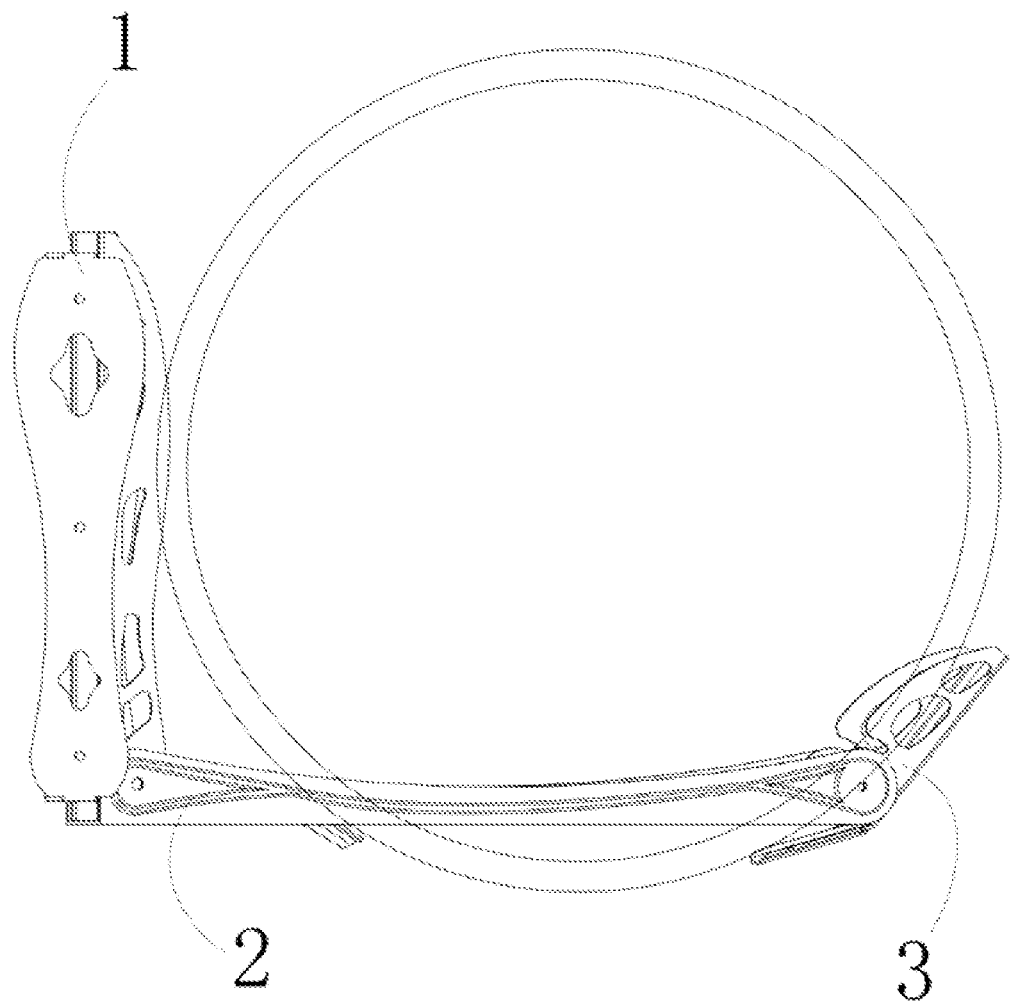
FIG. 5 is a structural diagram of the folding bicycle rack according to Embodiment 1 when used.
Figure 6:
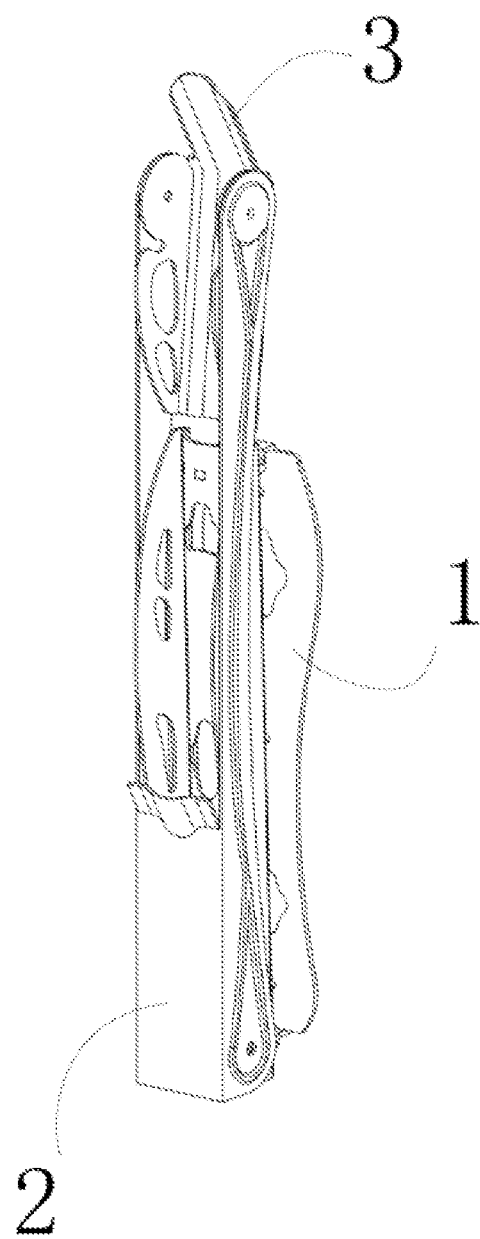
FIG. 6 is a structural diagram of the folding bicycle rack according to Embodiment 1 in a folded state.
Figure 7:
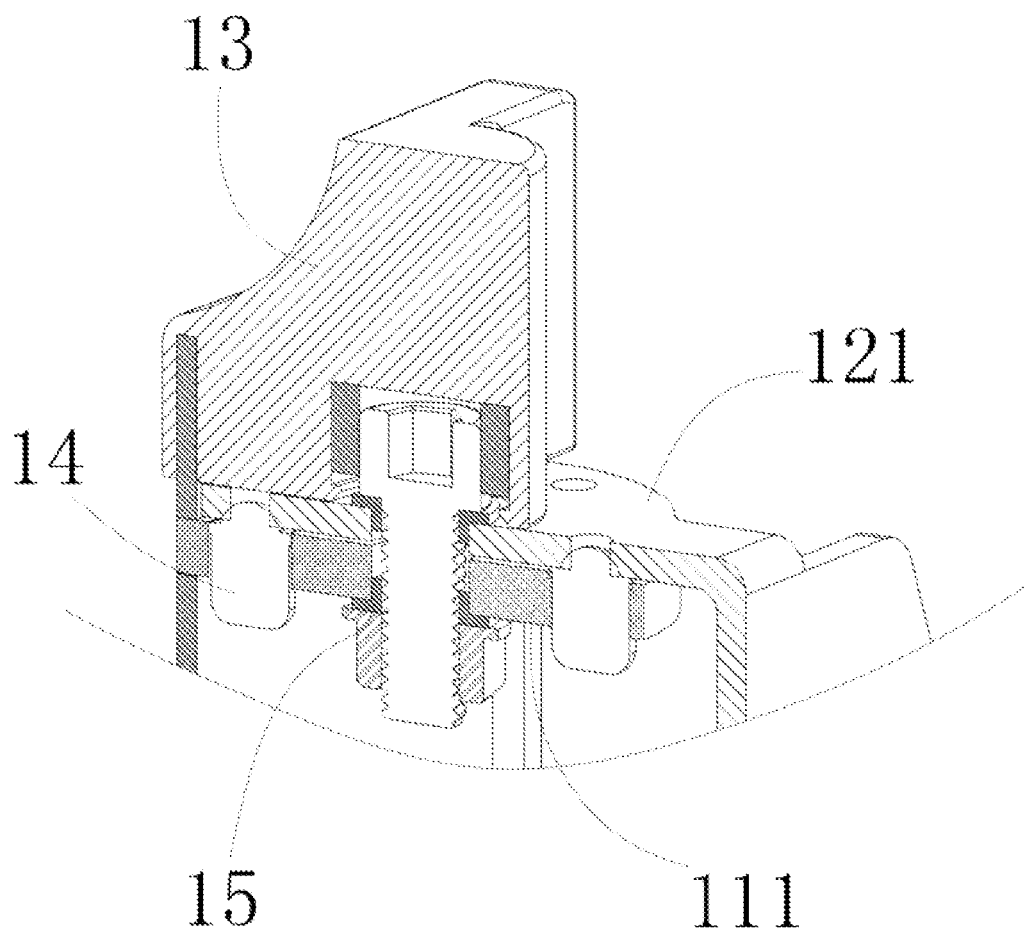
FIG. 7 schematically shows a part of the wall-mounting structure according to Embodiment 1 for connection with the wall.
Figure 8:
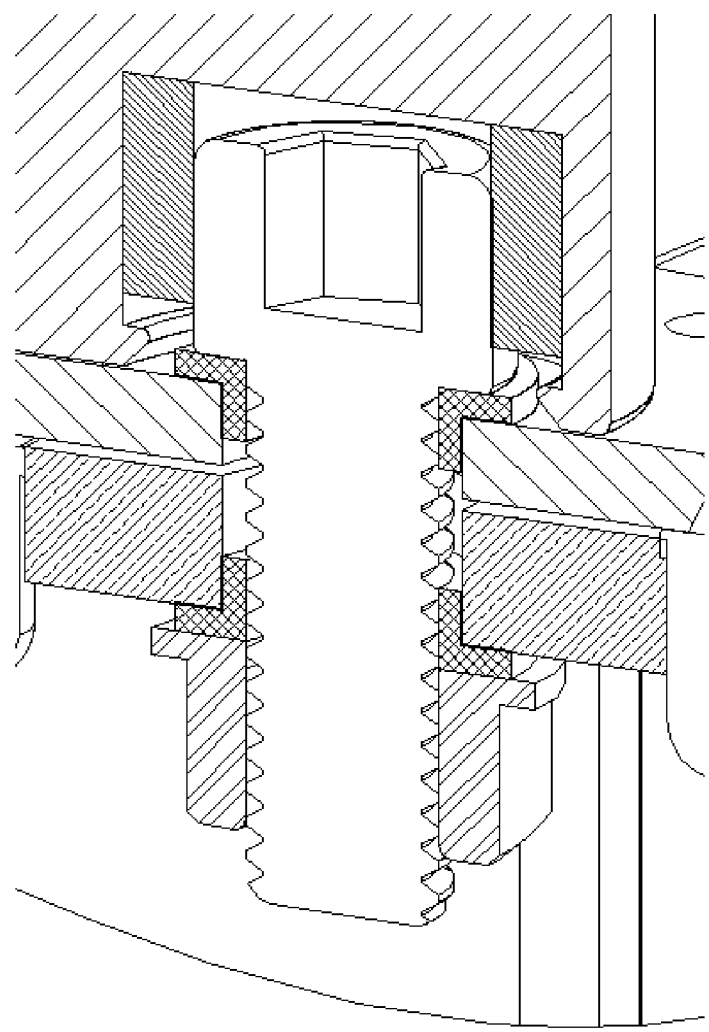
FIG. 8 is an enlarged structural diagram of a screw according to Embodiment 1.

The tilted structure 3 is located in the wheel-receiving groove 23 away from the wall. Specifically, the tilted structure 3 is located at a rear end of the wheel-receiving groove 23. The tilted structure 3 is located on an inner side of the end of the side plate 21 away from the wall-mounting structure 1, and is in rotational connection with the side plate 21. The tilted structure 3 includes a main body 31 and two second tire limit plates 32. The two second tire limit plates 32 are respectively fixedly connected to the two sides of the main body 31 of the tilted structure to restrict lateral movement of the tire. The two second tire limit plates 32 are both located at the inner side of the bottom frame 2 and are independently rotationally connected to the end of the bottom frame 2 away from the wall. In this embodiment, rivets are used for achieving the independently rotational connection. Rotation axes of the two second tire limit plates 32 are concentric to free up space for the tilted structure 3 to receive the tire. The angle formed by the upper and lower ends of the main body 31 of the tilted structure is obtuse, and the lower end of the main body 31 is arc-shaped. When the tire is hung and is propped by the two second tire limit plates 32, the arc surface of the lower end of the main body 31 can be affixed to the surface of the tire. In this embodiment, as shown in FIG. 4, the two second tire limit plates 32 are provided on two sides of a portion of the main body 31 forming an obtuse angle.

A rotation-stopping structure is provided between the outer side of the second tire limit plate 32 and the inner side of the corresponding side plate 21. The rotation-stopping structure includes at least one generatrix 25 and at least one sub-point 33. The generatrix 25 is fixedly arranged on the inner side wall of the side plate 21, and the sub-point 33 is fixedly arranged on the outer side of the second tire limit plate 32. The side plate 21 and the second tire limit plate 32 are in rotational connection about an axis. The generatrix 25 and the sub-point 33 are both provided on the same circumference centered on the axis, and a movement trajectory of the generatrix 25 at least partially overlaps a movement trajectory of the sub-point 33, so that the at least one generatrix 25 is capable of restricting a rotational angle of the at least one sub-point 33 in a forward and/or reverse direction.

The tilted structure 3 is at a first flip angle in an unfolded state, and in this time, the tilted structure 3 is located outside the wheel-receiving groove 23 with a downward inclination to guide the wheel to be pushed into the wheel-receiving groove 23. As for the first flip angle, in this embodiment, it means that the tilted structure 3 is at this time oriented towards the outer side of the bottom frame 2 away from the wall, so that the portion of the main body 31 of the tilted structure 3 that is away from the wall (the portion of the main body 31 that is provided with the second tire limit plate 32) is inclined in a direction away from the bottom frame 2 so that the wheel can be smoothly enter the whole of the tilted structure 3 through such portion of the main body 31. In this state, the generatrix 25 abuts against the sub-point 33 for limitation, and the main body 31 cannot continue to be turned downwardly sideways to maintain the form of guiding for the wheel entering.

The tilted structure 3 is at a second flip angle in a folded state, and in this time, the tilted structure 3 is at least partially folded and provided in the wheel-receiving groove 23. As for the second flip angle, in this embodiment, it refers that the portion (first portion) of the main body 31 provided with the second tire limit plate 32 is rotated to point in the direction of the wall and is located in the wheel-receiving groove 23 for the purpose of storage. In this state, the generatrix 25 abuts against the sub-point 33 for limitation, and the main body 31 cannot continue to be turned downwardly sideways to maintain the form of stowage. The other portion (second portion) of the main body 31 that is not provided with the second tire limit plate 32 is located on the lower side of the bottom frame 2. In this embodiment, since the length of the second portion of the main body 31 is shorter than the length of the first portion of the main body 31, the tilted structure 3 can be received in the wheel-receiving groove 23 from an overall viewpoint.

During a bicycle loading process, the tilted structure 3 is driven by the against pressure from the tire to maintain a follow-on connection with the tire, and has the ability to rotate freely with the tire within the range from the first flip angle to the second flip angle. In this embodiment, when the bicycle is loaded into the device, the tire is embedded in the tilted structure 3, and when the bicycle continues to be pressurized by the user towards the wall, the tire presses against the tilted structure 3, making the tilted structure 3 to rotate towards the wall (inward), i.e., transitioning from the first flip angle to the second flip angle. At the same time, the tire enters the wheel-receiving groove 23 along with the tilted structure 3, and is supported by the first tire limit plate 22 and the tilted structure 3 together, achieving a placement limit.

The working principle of the folding bicycle rack is described below.

In the folded state, the bottom frame 2 is flipped upward and embedded in the outer side of the wall-mounting structure 1 to achieve storage. In the state of use, the bottom frame 2 is flipped downward and kept perpendicular to the wall, and the front wheel of the bicycle is put into the wheel-receiving groove 23. The first tire limit plate 22 abuts against the front side of the front wheel, and the tilted structure 3 can be adapted to tires with different sizes due to its own ability to rotate freely. The main body 31 of the tilted structure 3 abuts against the back side of the front wheel, and at the same time, the second tire limit plate 32 is configured to clamp two sides of the front wheel, so that the front wheel is limited to move downward and sideways, avoiding the bicycle from falling down, and realizing the hanging of the bicycle.

Furthermore, in some embodiments, the number of the generatrix 25 is two, and the two generatrices are located on a circumference coaxial with the rotation axis between the side plate 21 and the second tire limit plate 32. The number of the sub-point 33 is two, and the two sub-point are located on the circumference where the generatrices 25 are located. The two generatrices 25 on the same side plate 21 are used for restricting the rotational angle of the corresponding second tire limit plate 32 in the forward and reverse directions, respectively.

Furthermore, in some embodiments, the end of the side plate 21 away from the wall-mounting structure 1 is cymbal-shaped bulging from the middle towards the outside. The end of the second tire limit plate 32 close to the bottom frame 2 is cymbal-shaped corresponding to the concave from the middle towards the inside. The generatrix 25 is fixedly provided on the cymbal-shaped surface of the side plate 21, and the sub-point 33 is fixedly provided on the cymbal-shaped surface of the second tire limit plate 32. The inner side of the side plate 21 abuts against and attaches to the outer side of the second tire limit plate 32. The two cymbal-shaped surfaces form a hollow chamber. The rotation centers of the side plate 21 and the second tire limit plate 32 are coaxial with the hollow chamber, so that the generatrix 25 and the sub-point 33 of the rotation-stopping structure can be stowed, and the side plate 21 and the second tire limit plate 32 can be kept in close contact and matched at the same time. In this way, complex functions can be achieved by means of a simple structure.

Furthermore, in some embodiments, the wall-mounting structure 1 includes a vertical frame 11 and a mounting base 12. The lower end of the vertical frame 11 is rotationally connected to the end of the bottom frame 2 near the wall. The mounting base 12 is arranged between the vertical frame 11 and the wall. The mounting base 12 is rotationally connected to the back side of the vertical frame 11, and is rotated around a vertical rotation axis. The mounting base 12 is fixedly arranged on the wall, so that the wall-mounting structure 1 can drive the bottom frame 2 to adjust the angle with the wall, which facilitates the hanging of the bicycle at an angle matching the actual scene. Moreover, in the folded state, the portion of the rack protruding outwardly from the wall is smaller in size, which is more conducive to stowage.

Furthermore, in some embodiments, the outer side wall of the wall-mounting structure 1 is fixedly provided with a convex point, and the inner side wall of the bottom frame 2 is provided with a concave point that cooperates with the convex point, such that the wall-mounting structure 1 and the bottom frame 2 can be clasped together when they are overlapped and folded, making the clasping more solid.

Furthermore, in some embodiments, the upper and lower ends of the back side (the side near the wall) of the vertical frame 11 are respectively clamped with a base plate 111, and a plurality of through placing holes are provided at the upper end of the base plate 111. The upper and lower ends of the front side (the side away from the wall) of the mounting base 12 are each fixedly provided with a top plate 121, and a plurality of limiting through holes are provided at the upper end of the top plate 121. The top plate 121 on the upper side is located at the upper side of the base plate 111 on the upper side, and the top plate 121 on the lower side is located at the lower side of the base plate 111 on the lower side. The placing holes of the base plate 111 are provided with a marble 14, and an outer end of the marble 14 is located on the side of the base plate 111 near the top plate 121. During installation, the outer end of the marble 14 is snapped into the limiting through holes of the top plate 121 to achieve rotation-stopping limitation of the vertical frame 11 and the mounting base 12. The center of the base plate 111 and the center of the top plate 121 are both provided with a through mounting hole. A bolt is provided to be threaded through the mounting hole to lock the vertical frame 11 and the mounting base 12 in upward and downward directions. A first damping washer 15 is provided between the head of the bolt and the top plate 121, and a second damping washer 15 is provided between the nut and the base plate 111 to increase the rotation resistance between the vertical frame 11 and the mounting base 12, so that the vertical frame 11 will not be easily rotated during use.

Furthermore, in some embodiments, a protective casing 13 is provided. The protective casing 13 is made of a soft material (preferably plastic). The protective casing 13 is provided on the outer side of the head of the bolt, and is in snap fit with the end of the vertical frame 11 to protect the bolt. In addition, a gap-filling bushing is provided between the protective casing 13 and the head of the bolt to fill the gap between the protective casing 13 and the head of the bolt, so that the protective casing 13 directly or indirectly abuts against the head of the bolt to ensure a tighter connection.

Furthermore, in some embodiments, both the first tire limit plate 22 and the main body 31 of the tilted structure 3 have a sheet structure with higher stiffness. When the bicycle is hung, the tire will produce a certain elastic deformation under the influence of gravity, and the sheet-shaped main body 31 and the first tire limit plate 22 can increase the contact area with the surface of the tire, thereby reducing the effect of pressure. Compared with the existing limiting member made of a steel bar, the marks on the surface of the tire due to the long-term hanging can be effectively avoided.

Furthermore, in some embodiments, the center of gravity of the tilted structure 3 is not located at the axis of rotation between the tilted structure 3 and the bottom frame 2. In this embodiment, the length of the portion of the main body 31 not provided with the second tire limit plate 32 is shorter than the length of the other portion of the main body 31 provided with the second tire limit plate 32, thus, the center of gravity of the tilted structure 3 is not located on the axis of rotation of the tilted structure 3 and the bottom frame 2, but on the portion of the main body 31 provided with the second tire limit plate 32. In this case, the tilted structure, in a free state (a state not influenced by the wheel), always has a tendency to rotate towards the first flip angle or the second flip angle (in particular, the tilted structure 3 automatically maintains the first flip angle in the unfolded state, and automatically maintains the second flip angle in the folded state), so as to automatically hold the wheel-guiding posture or the wheel-supporting posture, which requires no human adjustment, and thus is easy to use and saves effort.

Embodiment 2

Referring to FIGS. 9-16, a folding bicycle rack with automatic wheel fixing is provided, which includes a wall-mounting structure 1, a bottom frame 2, a tilted structure 3 and a positioning wheel 4. A plurality of positioning holes are provided on two sides of the bottom frame 2, and are symmetrically located about the center of the positioning wheel 4. Two ends of the positioning wheel 4 are each slidably connected with a fixing ring 41, and the two fixing rings 41 are respectively clamped to a pair of positioning holes. The plurality of positioning holes are located near an end of the wall-mounting structure 1, and adjacent positioning holes on the same side are connected to each other through a first chute 24 running through a side end of the bottom frame 2. The arrangements of the wall-mounting structure 1, the bottom frame 2 and the tilted structure 3 are the same as those in Embodiment 1, and will not be repeated herein.

The diameter of the positioning hole is larger than the width of the first chute 24. Two ends of the positioning wheel 4 are clamped into the positioning holes to limit the movement of the positioning wheel, which can act as a block for the tire, preventing the bicycle with smaller tires from falling off.

When the hung-in tire cannot be blocked by the first tire limit plate 22, the positioning wheel 4 can slide in the first chute 24 until it contacts the tire, and the contact surface is arc-shape for fitting with the tire. It can protect the tire from wear and tear, and the positioning wheel 4 can better fit with the tire, preventing the bicycle from falling off.

Two inner sidewalls of the side plate 21 away from the end of the wall are each provided with a limiting protrusion 26. The convex 26 is provided within the rotation range of the tilted structure 3 to abut against the outer end surface of the tilted structure 3 when the tilted structure 3 is at the first flip angle and the second flip angle, so as to limit the forward and/or reverse rotation of the tilted structure 3. Specifically, a gap exists between the second tire limit plate 32 and the main body 31 of the tilted structure 3 (the portion not provided with the second tire limit plate 32). When the tilted structure 3 is at the first flip angle, the limiting protrusion 26 is located within the gap to abuts against the tilted structure 3, so as to prevent the tilted structure from continuing to turn outwardly. A second chute 34 is provided in the portion the second tire limit plate 32 close to the axis of rotation, and the second chute 34 is overlapped with the rotational path of the limiting protrusion 26 with respect to the axis of rotation, that is, the limiting protrusion 26 is located within the second chute 34 when the tilted structure 3 is at the second flip angle, so as to resist the tilted structure 3 from continuing to flip inwards.

The working principle of the bicycle rack provided herein is described below.

Figure 9:
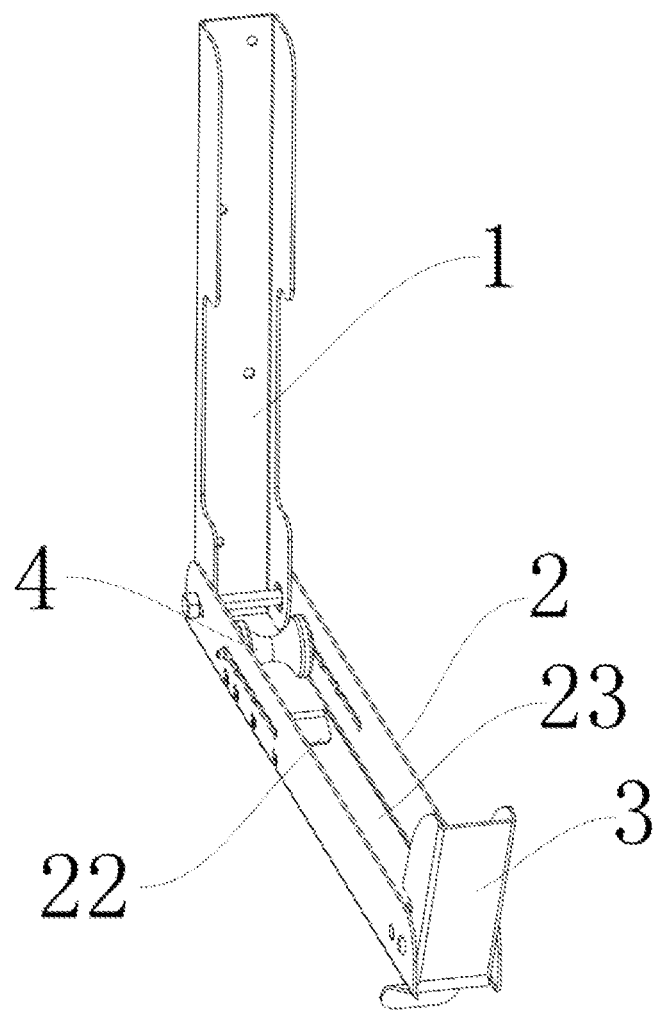
FIG. 9 is a structural diagram of a folding bicycle rack according to Embodiment 2 in an unfolded state.
Figure 10:
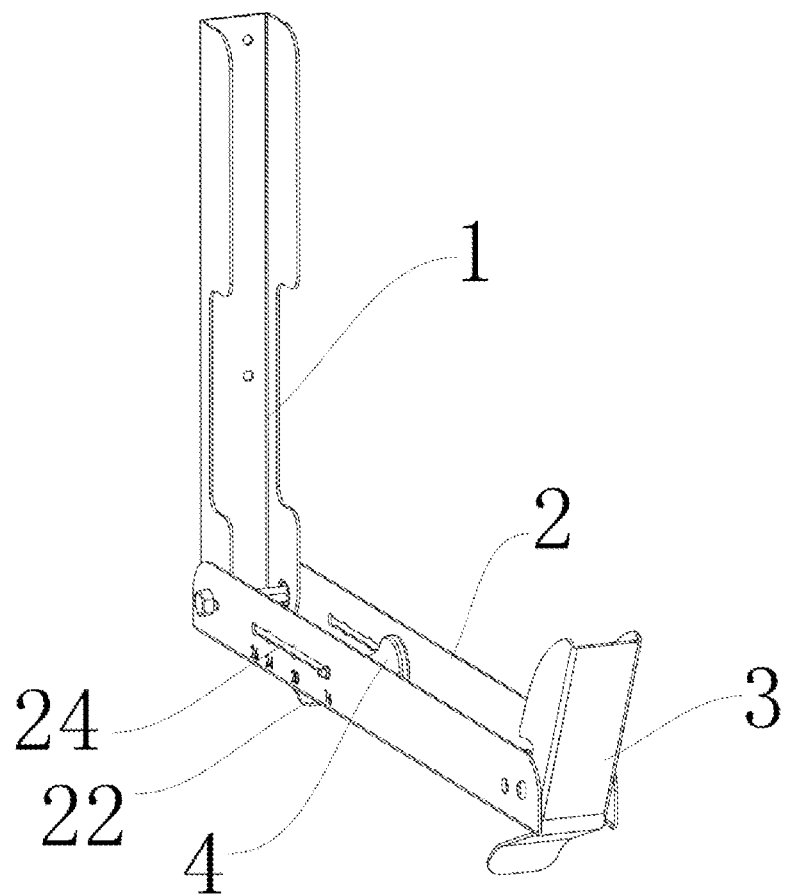
FIG. 10 is a structural diagram of a bottom frame of the folding bicycle rack according to Embodiment 2.
Figure 15:
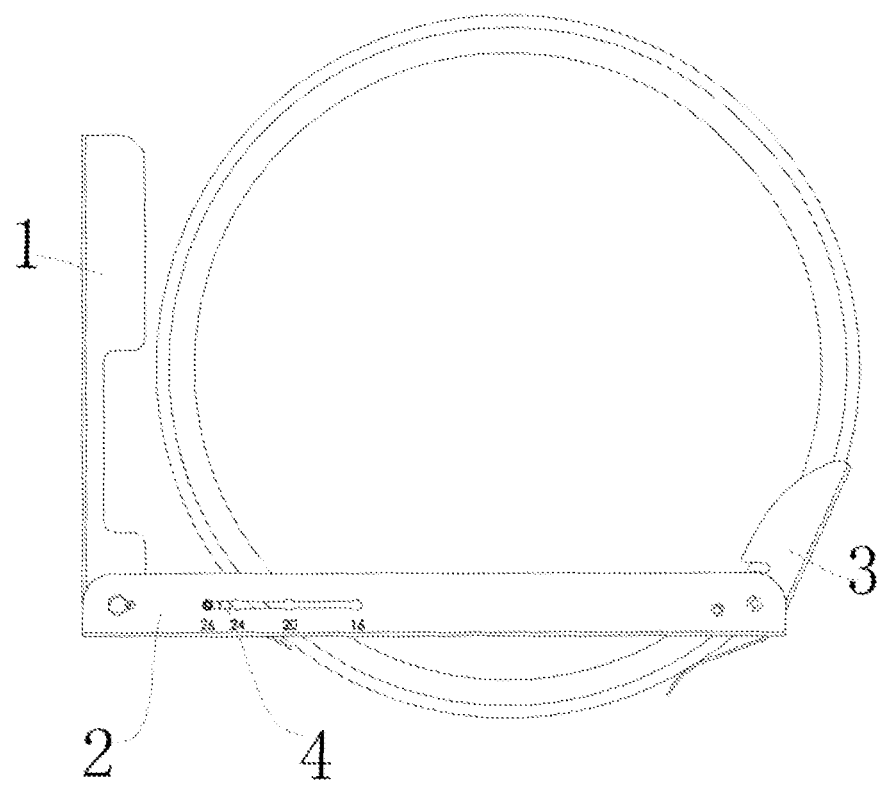
FIG. 15 is a structural diagram of the folding bicycle rack according to Embodiment 2 when used.
Figure 16:
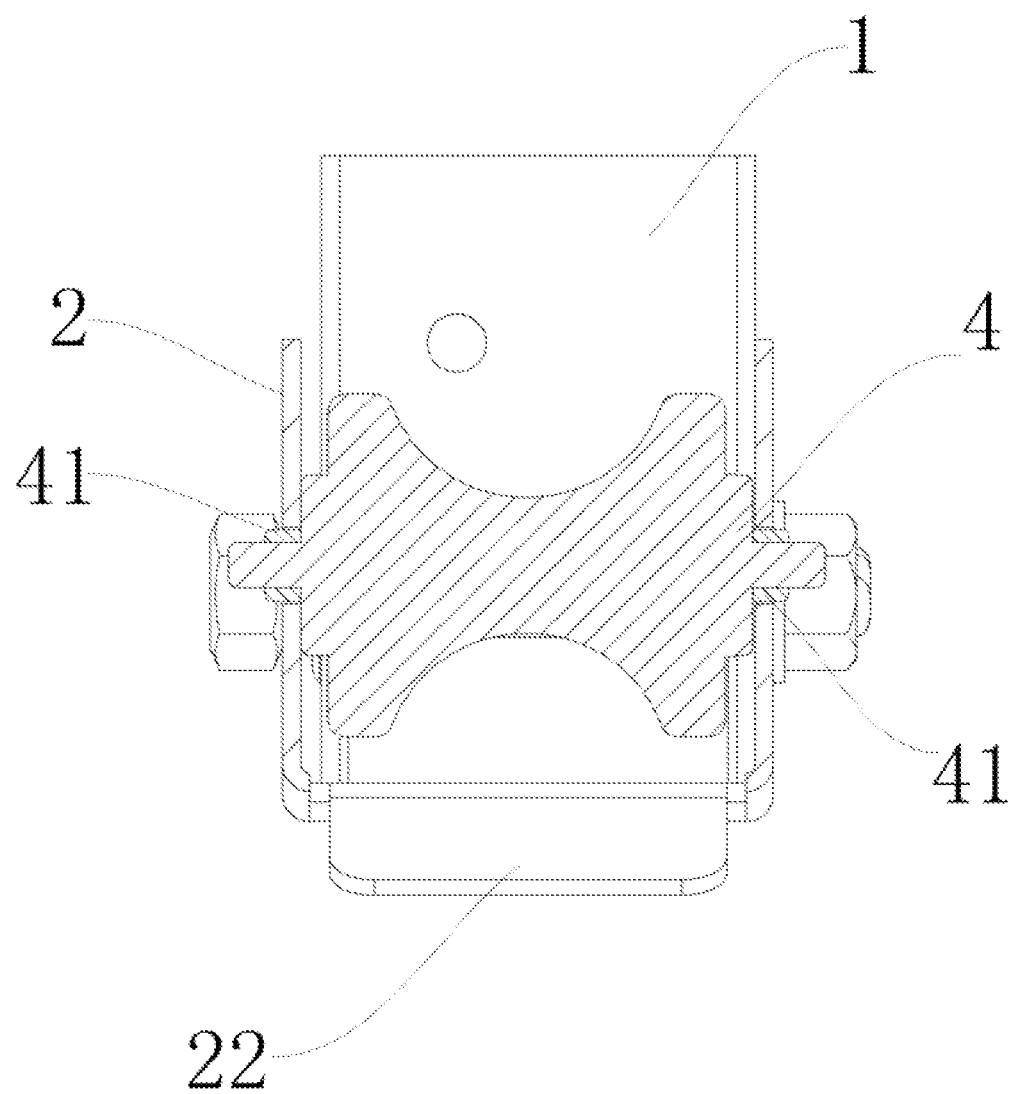
FIG. 16 is a sectional view of the folding bicycle rack according to Embodiment 2 when used.

When the bicycle rack is in use, as shown in FIG. 9, the bottom frame 2 is swung away from the wall to present a horizontal state due to gravity, since the rotational range bottom frame 2 is from horizontal to vertically upward. In this time, the front tire of the bicycle can be put into the wheel-receiving groove 23, as shown in FIG. 15.

When a bicycle with a large tire is hung, the first tire limit plate 22 will block one end of the front wheel of the bicycle, and the lower end of the main body 31 of the tilted structure 3 will also block the other end of the front wheel of the bicycle. The bicycle will press down on the lower end of the main body 31 of the tilted structure 3 due to gravity effect, so that the tilted structure 3 will rotate counterclockwise as shown in FIG. 15, thereby allowing the upper end of the main body 31 to block the front wheel of the bicycle. The bicycle is vertically placed with the handle facing outwards, so that the bicycle can be fixed to the bicycle rack, because the first tire limit plate 22 and the tilted structure 3 block the bicycle in the direction opposite to gravity to avoid the bicycle from falling off.

When a bicycle with a small tire is hung, the first tire limit plate 22 is unable to block one end of the front wheel of the bicycle, rendering the front wheel of the bicycle to fall off. Two ends of the positioning wheel 4 are each slidingly connected with a fixing ring 41, and the two fixing rings 41 are respectively clamped into the positioning holes on the two sides of the bottom frame 2, and the adjacent positioning holes on the same side are connected to each other by the first chute 24 which passes through the lateral end of the bottom frame 2. By such arrangements, the two fixing rings 41 can be taken out of the two ends of the positioning wheel 4 through sliding, so that the positioning wheel 4 can slide in the first chute 24. At this time, the positioning wheel 4 can be moved in first chute 24 along the direction away from the wall until it can touch the end of the front wheel of the bicycle and it can be ascertained that the front wheel of the bicycle cannot be dropped. Subsequently, the two fixing rings 41 are mounted to the two ends of the positioning wheel 4, and are respectively clamped into the two positioning holes away from the wall such that the positioning wheel 4 cannot slide in the first chute 24, thereby blocking the front wheel of the bicycle to avoid it from falling off. The bicycle rack provided herein can adapt to different sizes of wheels, and the bottom frame 2, the first tire limit plate 22, the tilted structure 3 and the positioning wheel 4 can protect the tire.

Figure 11:
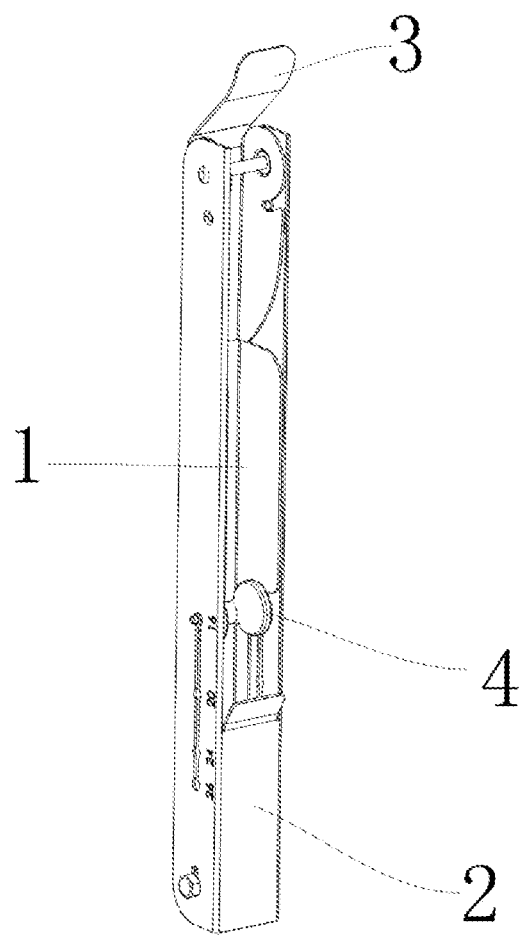
FIG. 11 is a structural diagram of the folding bicycle rack according to Embodiment 2 in a folded state.
Figure 12:
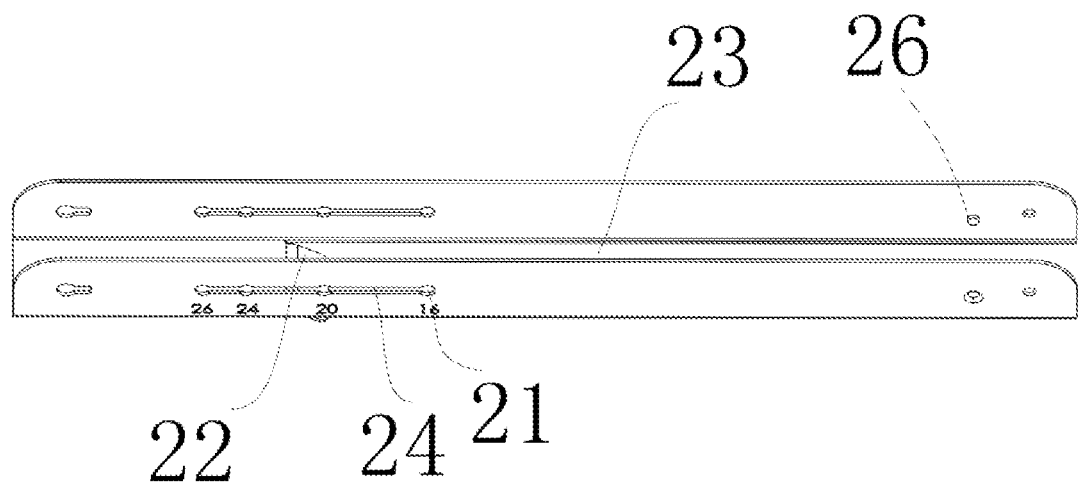
FIG. 12 is a structural diagram of a chute of the folding bicycle rack according to Embodiment 2.
Figure 13:
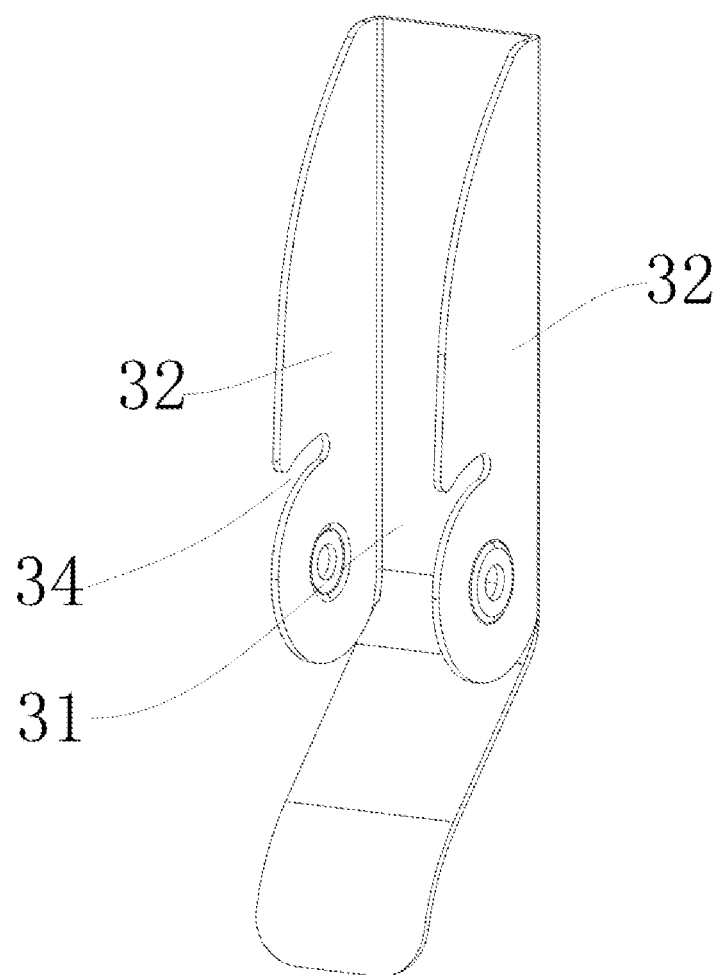
FIG. 13 is a structural diagram of a tilted structure of the folding bicycle rack according to Embodiment 2.
Figure 14:
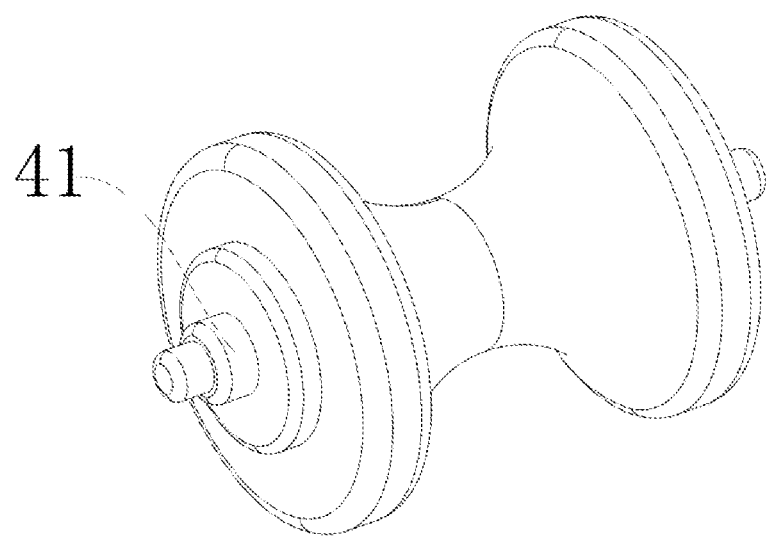
FIG. 14 is a structural diagram of a positioning wheel of the folding bicycle rack according to Embodiment 2.

When the bicycle rack is not in use, as shown in FIG. 11, the bottom frame 2 can be rotated upward to present a vertical state, and the tilted structure 3 is also in a vertical state. Such folded state is space-saving.

In addition, it should be emphasized that the technical solution of the present embodiment can also make other preferred settings, which are the same as the preferred settings in Embodiment 1.

In addition, in this embodiment, the rotation-stopping structure of the tilted structure 3 and the bottom frame 2 may also be replaced with reference to the scheme in Embodiment 1.

What is claimed is:

1. A folding bicycle rack with automatic wheel fixing, comprising:
a wall-mounting structure;
a bottom frame; and
an adjustable positioning assembly;
wherein the wall-mounting structure is vertically fixed on a wall;
an end of the bottom frame is in a restricted rotational connection with a lower end of the wall-mounting structure; the bottom frame is provided with a wheel-receiving groove; and a bottom surface of the wheel-receiving groove is provided with a through hole for embedding a tire;
the adjustable positioning assembly comprises a positioning member and a-tilted structure; the positioning member is arranged at a side in the wheel-receiving groove adjacent to the wall, and is fixedly arranged when in use; the tilted structure is arranged at a side in the wheel-receiving groove away from the wall, and is in a restricted rotational connection with an end of the bottom frame away from the wall; and the positioning member and the tilted structure are configured to abut against the tire respectively from the front and rear to support the tire and limit downward movement of the tire; and the positioning member comprises a tire limit plate; the tire limit plate is fixedly connected to a bottom end of the bottom frame; and the tire limit plate is inclined in a direction away from the bottom frame, and extends towards the wheel-receiving groove such that the tire limit plate is located at a lower side of the tire to support the tire when a bicycle is mounted on the wall.

2. The folding bicycle rack of claim 1, wherein the positioning member comprises a positioning wheel; two sides of the bottom frame are each provided with a plurality of positioning holes, and the plurality of positioning holes on one side of the bottom frame and the plurality of positioning holes on the other side of the bottom frame are symmetrically distributed with respect to a center of the positioning wheel; two ends of the positioning wheel are each slidably connected with a fixing ring; two fixing rings are respectively clamped into a pair of symmetrical positioning holes respectively on the two sides of the bottom frame; the plurality of positioning holes are located an end of the bottom frame near the wall-mounting structure, and adjacent positioning holes on the same side are communicated with each other through a chute running through a side end of the bottom frame; a length of the wheel-receiving groove is smaller than a length of the bottom frame; the positioning wheel is detachably arranged on an upper side of the tire limit plate; and a diameter of each of the plurality of positioning holes is larger than a width of the chute.

3. The folding bicycle rack of claim 1, wherein a support part of the tilted structure is sheet-shaped, and the tire limit plate is sheet-shaped.

4. The folding bicycle rack of claim 1, wherein a rotation angle range of the bottom frame is 90° from a horizontal direction to a vertically upward direction.

5. The folding bicycle rack of claim 1, wherein the tilted structure comprises a main body and two tire limit plates; the two tire limit plates are respectively fixedly connected to two sides of the main body of the tilted structure to restrict lateral movement of the tire; the two tire limit plates are both located at an inner side of the bottom frame, and are independently rotationally connected to the end of the bottom frame away from the wall; and rotational axes of the two tire limit plates are concentric to make the tilted structure have space to receive the tire.

6. The folding bicycle rack of claim 5, wherein an angle formed by an upper end and a lower end of the main body of the tilted structure is an obtuse angle; the lower end of the main body of the tilted structure is arc-shaped; and when the tire is embedded and is propped by the two tire limit plates, an arc surface of the lower end of the main body of the tilted structure fits a surface of the tire.

7. The folding bicycle rack of claim 1, wherein the bottom frame comprises two side plates and a base plate; the two side plates are fixedly arranged on two sides of the base plate, respectively; a length of each of the two side plates is greater than that of the base plate such that the wheel-receiving groove is formed; the base plate is arranged at an end of each of the two side plates adjacent to the wall-mounting structure; an end of each of the two side plates away from the wall-mounting structure is located outside the tilted structure, and is in rotational connection with the tilted structure; and the tilted structure is provided at a first end of the wheel-receiving groove, and the base plate is provided at a second end of the wheel-receiving groove.

8. The folding bicycle rack of claim 1, wherein the tilted structure is at a first rotation angle in an unfolded state, and at this time, the tilted structure is located outside the wheel-receiving groove and extends outwards to guide the tire into the wheel-receiving groove; the tilted structure is at a second rotation angle in a folded state, and at this time, the tilted structure is at least partially accommodated in the wheel-receiving groove; and during a bicycle loading process, the tilted structure is pressed by the tire to maintain a transmission connection with the tire, such that the tilted structure is capable of rotating freely with the tire within a range from the first rotation angle to the second rotation angle.

9. The folding bicycle rack of claim 8, wherein a rotation-stopping structure is provided between an inner side wall at an end of the wheel-receiving groove away from the wall-mounting structure and an outer side wall of the tilted structure; the rotation-stopping structure comprises at least one generatrix and at least one sub-point; the at least one generatrix is fixedly provided on the inner side wall of the wheel-receiving groove, and the at least one sub-point is fixedly provided on the outer side of the tilted structure; the bottom frame and the tilted structure are in rotational connection about a rotation axis; and the at least one generatrix and the at least one sub-point are both provided on the same circumference centered on the rotation axis, and a movement trajectory of the at least one generatrix at least partially overlaps a movement trajectory of the at least one sub-point, so that the at least one generatrix is capable of restricting a rotational angle of the at least one sub-point in a forward and/or reverse direction.

10. The folding bicycle rack of claim 9, wherein the number of the at least one generatrix is two, and two generatrices are located on a circumference coaxial with the rotation axis between the bottom frame and the tilted structure; the number of the at least one sub-point is two, and two sub-points are located on the circumference where the two generatrices are located; and the two generatrices on the same inner side wall of the wheel-receiving groove are configured for restricting a rotational angle of the tilted structure in the forward and reverse directions, respectively.

11. The folding bicycle rack of claim 9, wherein the inner side wall at the end of the wheel-receiving groove away from the wall-mounting structure has a first cymbal-shaped surface with a middle bulging towards outside; the outer side wall of the tilted structure has a second cymbal-shaped surface having a protruding direction opposite to a protruding direction of the first cymbal-shaped surface, and the second cymbal-shaped surface is matched with the first cymbal-shaped surface; the at least one generatrix is fixedly provided on the first cymbal-shaped surface, and the at least one sub-point is fixedly provided on the second cymbal-shaped surface; the inner side wall of the wheel-receiving groove abuts against and fits the outer side wall of the tilted structure; the first cymbal-shaped surface and the second cymbal-shaped surface together form a hollow chamber; and the rotation axis between the bottom frame and the tilted structure is coaxial with the hollow chamber.

12. The folding bicycle rack of claim 8, wherein a center of gravity of the tilted structure is not located at a rotation axis between the tilted structure and the bottom frame, so that the tilted structure always has a tendency to rotate towards the first rotation angle or the second rotation angle under a free state.

13. The folding bicycle rack of claim 8, wherein two inner sidewalls at an end of the wheel-receiving groove away from the wall are each provided with a limiting protrusion; and the limiting protrusion is located within a rotation range of the tilted structure to abut against an outer side end surface of the tilted structure when the tilted structure is at the first rotation angle and the second rotation angle, so as to limit a forward and/or reverse rotation of the tilted structure.

14. A folding bicycle rack with automatic wheel fixing, comprising:
   a wall-mounting structure;
   a bottom frame; and
   an adjustable positioning assembly:
   wherein the wall-mounting structure is vertically fixed on a wall;
   an end of the bottom frame is in a restricted rotational connection with a lower end of the wall-mounting structure; the bottom frame is provided with a wheel-receiving groove; and a bottom surface of the wheel-receiving groove is provided with a through hole for embedding a tire;
   the adjustable positioning assembly comprises a positioning member and a tilted structure; the positioning member is arranged at a side in the wheel-receiving groove adjacent to the wall, and is fixedly arranged when in use; the tilted structure is arranged at a side in the wheel-receiving groove away from the wall, and is in a restricted rotational connection with an end of the bottom frame away from the wall; and the positioning member and the tilted structure are configured to abut against the tire respectively from the front and rear to support the tire and limit downward movement of the tire; and
   the wall-mounting structure comprises a vertical frame and a mounting base; a lower end of the vertical frame is rotationally connected to the end of the bottom frame near the wall; the mounting base is arranged between the vertical frame and the wall; the mounting base is rotationally connected to a back side of the vertical frame around a vertical rotation axis; and the mounting base is fixedly arranged on the wall.

15. The folding bicycle rack of claim 14, wherein the back side of the vertical frame is provided with at least two base plates; a front side of the mounting base is provided a plurality of top plates coaxially corresponding to the at least two base plates; a center of each of the at least two base plates and a center of each of the plurality of top plates are both provided with a mounting through hole; a bolt is provided in the mounting through hole to lock the vertical frame and the mounting base; and a first damping washer is provided between a head of the bolt and each of the plurality of top plates, and a second damping washer is provided between a nut and each of the at least two base plates to increase rotation resistance between the vertical frame and the mounting base.

16. The folding bicycle rack of claim 15, wherein an upper end of each of the at least two base plates is provided with a plurality of accommodating through holes; an upper end of each of the plurality of top plates is provided with a plurality of limiting through holes; a marble is provided in each of the plurality of accommodating through holes; an outer end of the marble is located on a side of each of the at least two base plates near a corresponding top plate; and during installation, the outer end of the marble is clamped into one of the plurality of limiting through holes to limit rotation between the vertical frame and the mounting base.

17. The folding bicycle rack of claim 15, wherein a protective casing is provided on an outer side of the head of the bolt, and is made of a soft material; the protective casing is in snap fit with an end of the vertical frame; and the protective casing directly or indirectly abuts against the head of the bolt.

18. A folding bicycle rack, wherein with automatic wheel fixing, comprising:
   a wall-mounting structure;
   a bottom frame; and
   an adjustable positioning assembly;
   wherein the wall-mounting structure is vertically fixed on a wall;
   an end of the bottom frame is in a restricted rotational connection with a lower end of the wall-mounting structure; the bottom frame is provided with a wheel-receiving groove; and a bottom surface of the wheel-receiving groove is provided with a through hole for embedding a tire;
   the adjustable positioning assembly comprises a positioning member and a tilted structure; the positioning member is arranged at a side in the wheel-receiving groove adjacent to the wall, and is fixedly arranged when in use; the tilted structure is arranged at a side in the wheel-receiving groove away from the wall, and is in a restricted rotational connection with an end of the bottom frame away from the wall; and the positioning member and the tilted structure are configured to abut against the tire respectively from the front and rear to support the tire and limit downward movement of the tire; and
   a width of the wheel-receiving groove is larger than or equal to a width between outer edges of the wall-mounting structure, and a length of the bottom frame is larger than a length of the wall-mounting structure, so that the wall-mounting structure is capable of being accommodated in the bottom frame after the bottom frame is turned upwards and folded.

19. The folding bicycle rack of claim 18, wherein an outer sidewall of the wall-mounting structure is fixedly provided with a protrusion, and an inner side wall of the bottom frame is provided with a depression fitting the protrusion, so as to achieve snap fit between the wall-mounting structure and the bottom frame when the bottom frame is folded to overlap the wall-mounting structure.

\* \* \* \* \*